(12) United States Patent
Priore

(10) Patent No.: US 11,083,181 B2
(45) Date of Patent: Aug. 10, 2021

(54) DETACHABLE WEIGHT ASSEMBLY FOR FISHING LURE

(71) Applicant: Rocco Nicola Priore, Zephyr (CA)

(72) Inventor: Rocco Nicola Priore, Zephyr (CA)

( * ) Notice: Subject to any disclaimer, the term of this patent is extended or adjusted under 35 U.S.C. 154(b) by 200 days.

(21) Appl. No.: 16/510,404

(22) Filed: Jul. 12, 2019

(65) Prior Publication Data

US 2021/0007339 A1    Jan. 14, 2021

(51) Int. Cl.
  *A01K 95/02*    (2006.01)
  *A01K 95/00*    (2006.01)

(52) U.S. Cl.
  CPC ............ *A01K 95/02* (2013.01); *A01K 95/005* (2013.01)

(58) Field of Classification Search
  CPC ...... A01K 95/00; A01K 95/02; A01K 95/005; A01K 93/00; Y10T 24/4578; A44B 99/005
  See application file for complete search history.

(56) References Cited

U.S. PATENT DOCUMENTS

| | | | | |
|---|---|---|---|---|
| 867,162 A | * | 9/1907 | Seidl ........................ | A44C 5/22 24/574.1 |
| 2,476,088 A | * | 7/1949 | Gleason .................. | A01K 95/00 43/43.14 |
| 2,488,475 A | * | 11/1949 | Merritt .................. | H01F 29/146 43/43.12 |
| 2,509,704 A | * | 5/1950 | Streitwieser ........... | A01K 93/00 43/43.12 |
| 2,517,375 A | * | 8/1950 | Anderson .............. | A01K 95/00 43/43.14 |
| 2,557,776 A | * | 6/1951 | Anderson .............. | A01K 95/00 43/43.14 |
| 2,736,026 A | * | 2/1956 | Belokin .................. | A01K 95/02 29/817 |
| 2,804,715 A | * | 9/1957 | Kimbrough ............ | A01K 95/00 43/44.87 |
| 2,875,551 A | * | 3/1959 | Tolle ...................... | A01K 95/00 43/44.95 |
| 2,876,582 A | * | 3/1959 | Schmidt ................. | A01K 93/00 43/44.95 |
| 2,892,282 A | * | 6/1959 | Rentz ..................... | A01K 91/06 43/42.72 |
| 2,902,304 A | * | 9/1959 | Smith ..................... | A01K 85/16 403/18 |
| 2,994,622 A | * | 8/1961 | Miller .................... | A01K 95/00 177/226 |

(Continued)

*Primary Examiner* — Magdalena Topolski
*Assistant Examiner* — Shada Mohamed Alghailani
(74) *Attorney, Agent, or Firm* — Nasser Ashgriz; UI Patent Inc.

(57) ABSTRACT

The present invention is an interchangeable weight assembly adaptable to quickly and easily be placed on a fishing lure for the purpose of increasing and decreasing the fishing weight. The fishing weight of the present invention comprises of a weight body and a connecting member, which provide connectors to connect the fishing weight to the fishing line and fishing lure. The fishing weight body is centrally bored to build a channel in which the connecting member can slidably be inserted and supported tightly therein and be quickly and easily removed by a novel mechanism of the present invention to change the fishing weight to selectively decrease or increase the weight of the fishing lure and the hook.

8 Claims, 6 Drawing Sheets

(56) References Cited

U.S. PATENT DOCUMENTS

| | | | | |
|---|---|---|---|---|
| 3,009,279 A * | 11/1961 | Jacobson | A01K 85/18 43/42.09 |
| 3,177,606 A * | 4/1965 | Benoit | A01K 95/00 43/43.12 |
| 3,357,124 A * | 12/1967 | Stepacoff | A01K 85/16 43/42.09 |
| 3,465,465 A * | 9/1969 | Kirkowski | A01K 97/24 43/42.72 |
| 3,718,950 A * | 3/1973 | Engstrom | F16B 5/0642 411/347 |
| 3,803,749 A * | 4/1974 | Boyum | A01K 95/00 43/44.9 |
| 4,030,225 A * | 6/1977 | Earley | A01K 91/04 43/42.09 |
| 4,472,903 A * | 9/1984 | Hutson | A01K 95/00 43/44.91 |
| 4,744,392 A * | 5/1988 | Tade, III | F16L 55/10 138/89 |
| 5,197,220 A * | 3/1993 | Gibbs | A01K 85/16 43/42.09 |
| 5,491,927 A * | 2/1996 | Ortiz | A01K 85/00 43/42.28 |
| 6,094,854 A * | 8/2000 | Dalier, Jr. | A01K 85/16 43/42.02 |
| 6,468,012 B2 * | 10/2002 | Ellis | F16B 41/002 411/107 |
| 6,612,066 B1 * | 9/2003 | James | A01K 93/00 43/43.14 |
| 6,883,211 B2 * | 4/2005 | Hoshino | A44C 5/2061 24/663 |
| 8,616,819 B1 * | 12/2013 | Koster | F16B 5/10 411/551 |
| 9,351,544 B2 * | 5/2016 | Matsumori | A44C 25/00 |
| 10,945,494 B1 * | 3/2021 | Thomsen | A44B 17/0076 |
| 2004/0010960 A1 * | 1/2004 | Adams | A01K 95/00 43/44.96 |
| 2006/0016118 A1 * | 1/2006 | Zuk | A01K 97/06 43/42.09 |
| 2012/0000111 A1 * | 1/2012 | Griffin | A01K 85/00 43/42.09 |
| 2012/0005946 A1 * | 1/2012 | Bennis | A01K 85/00 43/42.53 |
| 2012/0240449 A1 * | 9/2012 | Phillips | A01K 95/00 43/44.93 |
| 2013/0008075 A1 * | 1/2013 | Lindeman | A01K 95/02 43/43.12 |
| 2013/0008077 A1 * | 1/2013 | Koch-Schmidt | A01K 95/02 43/44.87 |
| 2013/0199080 A1 * | 8/2013 | Woosley | A01K 85/00 43/42.36 |
| 2013/0291424 A1 * | 11/2013 | Taylor | A01K 91/04 43/42.49 |
| 2017/0000097 A1 * | 1/2017 | Thomas | A01K 85/18 |
| 2018/0160667 A1 * | 6/2018 | Kissee | A01K 91/06 |
| 2018/0263230 A1 * | 9/2018 | Porter | A01K 95/02 |
| 2018/0360014 A1 * | 12/2018 | Bennis | A01K 93/02 |
| 2019/0008128 A1 * | 1/2019 | Walsh | A01K 85/00 |

* cited by examiner

DETACHABLE WEIGHT ASSEMBLY FOR FISHING LURE

FIELD OF THE INVENTION

The present invention relates in general to fishing lures and in specific to a fishing lure with interchangeable weight assembly adaptable to be quickly and easily attached and detached from the fishing lure.

BACKGROUND OF THE INVENTION

There are various types of lures available in fishing industry. Some of these lures are individually tailored to meet specific fishing conditions and, therefore, require that an angler stock and carry many lures to meet the various conditions.

One problem with lures is that different conditions require lures with variable depth running characteristics. In order to adapt to different conditions, the same style of fishing lure may be available as a floating lure, a shallow running lure, a medium depth running lure, or as a sinking, deep running lure. In order to fish under various conditions, the angler is forced to purchase a wide variety of lures and may also be forced to frequently change lures while fishing in order to adapt to various conditions.

This problem has been partially overcome by lures with attaching weight systems. Conventional artificial fishing lures commonly include a lightweight hard or soft plastic lure body, which is shaped and colored to resemble the appearance of a worm, crawfish, shad or other aquatic creatures and may be fitted with one or multiple fishing hooks. Live fishing lures, such as minnows or crickets, may also be lightweight. The lure body is typically tied on the end of the fishing line.

In many applications, therefore, it may be necessary or desirable to place one or multiple weights on the fishing hook or on the fishing line near the point of attachment with the fishing hook to increase the weight of the fishing lure. Increasing the weight of the fishing lure may increase the tendency of the lure to sink in the water.

A large variety of fish weights exist, which are used depending on the fish being pursued, the environment, the current and personal preferences. For the longest time, weights were made from lead and although lead is still being used today, other metals are replacing it because of lead's toxicity. In some fishing areas lead is banned and anglers must use other weights, made from non-toxic materials. Some lead alternatives are: brass, tungsten, steel, and bismuth.

One of the fishing lure weights, which is most commonly used with fishing lures, is a rounded bead having a slot, which receives the fishing line typically near the point of attachment of the fishing line to the fishing hook. The bead is crimped against the fishing line using pliers or the like to secure the weight to the line. One or multiple beads can be placed on the fishing line depending on the desired weight and the desired casting and sinking characteristics of the fishing lure.

One drawback of the conventional beaded fishing lure weight is that the weight typically requires the use of pliers to crimp the bead onto the fishing line. This process is usually critical so that the fish will often move on before the angler have tied the knot on the second weight. Moreover, the bead may have a tendency to become detached from the fishing line during casting or retrieval of the lure through the water. Other types of conventional fishing lure weights, such as slip sinkers, which are typically used with artificial fishing lures, may be cumbersome to place on and remove from the fishing hook or line.

SUMMARY OF THE INVENTION

The present invention relates in general to fishing lures and in specific to a fishing lure with various interchangeable weight assembly adaptable to be securely placed on a fishing lure to impart a selected weight and can be quickly and easily removed from the fishing lure as desired. This invention discloses a quick release fish weight that facilitates changing weights to achieve neutral buoyancy at predetermined depths. In operation, at least one fishing lure weight may be employed between a fishing line and a fishing lure for the purpose of increasing the weight of the fishing lure to sink in the water. Then, the fishing line is attached to the fishing hook.

The fishing weight of the present invention comprises a weight body and an attachment mean, which provides connectors to connect the fishing weight to the fishing lure and the fishing line. The fishing weight body is centrally bored to build a channel with rectangular cross-section in which the attachment means can slidably be inserted and tightly supported therein. The attachment means is a flexible rod element, which provides connectors to connect to the fishing line from one end and to the fishing lure from its other end.

In operation, the rod element of the fishing weight may be quickly and easily removed by a novel mechanism of the present invention to change the fishing weight to selectively and incrementally decrease or increase the weight of the fishing lure and the hook. The fishing lure weight of the present invention may be applicable to any type of fishing lure and can be constructed and moulded in any shape and provided in a kit form with various interchangeable weight parts adaptable to varying fishing conditions.

Generally, the weight body may have an elongated or elliptical egg, teardrop, polygonal or other shapes, which is consistent with the functional requirements of the fishing lure weight. The central channel has an uneven diameter along its length, thereby, the opening of the channel on the front end is larger than the opening of the channel on the back end. The rod element can slidably be inserted into the channel.

The rod element has a length slightly longer than the length of the weight and contains a compression spring. The rod member has a head portion on its distal end and a tail portion on its proximal end. The head portion of the rod on the distal end is smaller than the tail portion on the proximal end. The rod provides an eye ring on its proximal end to tie a fishing line thereto and an easy clip-twist connector on its distal end to provide a quick and easy attachment mechanism to a fishing lure.

In operation, the rod is pushed from its distal end toward the rear end into the channel from the front end, thereby, forcing the spring to be compressed and pushing the distal end of the rod to stick out of the channel. The rod is then rotated by 90 degrees clockwise or counter clockwise to align the rod heads with respect to the openings. The spring is interposed on the rod between the rod head on proximal end within the channel.

When changing the weight, the angler rotates the rod by 90 degrees clockwise or counter clockwise bringing the rod head in alignment with the opening to allow for it to pull the rod out of the channel. The rod can be connected to another weight in the same mechanism. The fishing weight can be attached to a fishing line and to a fishing lure. A fishing hook is knotted to the fishing line and is casted into a body of water.

The flexible rod member is the only connection between the weight body and the fishing line. To replace the weight body, the lure is disconnected from the rod, while the fishing line remains on the flexible rod member. The flexible rod is then pulled out of the weight and insert into another weight. The fishing lure is then attached back onto the rod.

It is an object of the present invention to provide an interchangeable weight assembly adaptable to be quickly and easily attached and detached from the fishing lure as desired, thereby adapted to various conditions.

It is another object of the present invention to provide an interchangeable weight assembly to swap out weight from lures with the simple turn, and a fast process.

It is another object of the present invention to provide a system to change weights as fast as possible to increase efficiency, which results in more time spent on fishing and not on tying lines. In many cases, the fish move on before the angler have tied the knot on the second weight.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
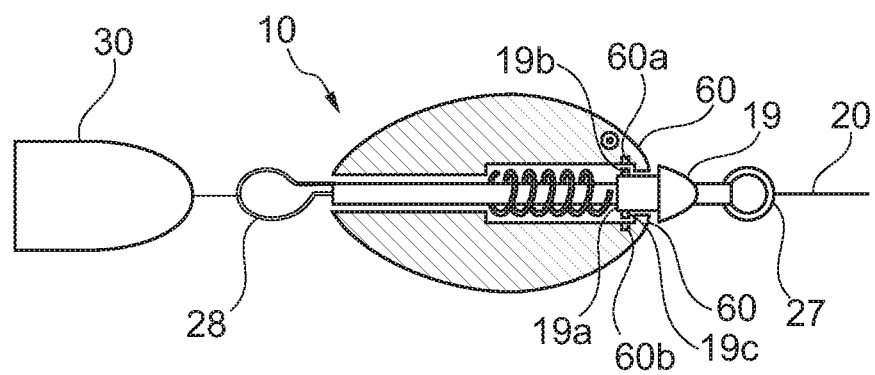
FIG. 1 is a longitudinal sectional view illustrating an interchangeable fishing weight according to the present invention, showing the device in connection position to a fishing lure and a fishing line.
Figure 2:
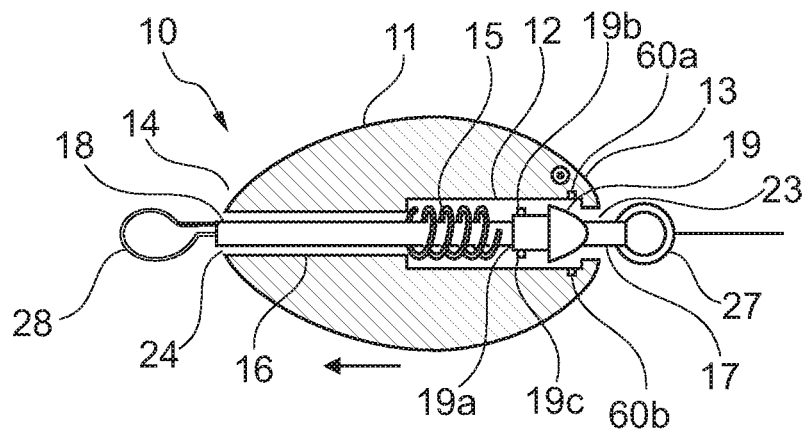
FIG. 2 is a longitudinal sectional view of the interchangeable fishing weight, when in action ready to insert the rod member within the fishing weight.

Referring to FIGS. 1 and 2 at least one fishing lure weight 10 may be employed between a fishing line 20 and a fishing lure 21 for the purpose of increasing the weight of the fishing lure 21 to sink in the water. The fishing line 20 is attached to the fishing hook.

The weight 10 comprising an elongated weight body 11 centrally bored in its central portion to build a channel 12. The channel 12 is sized to allow a rod 16 to slidably be inserted inside the channel 12 and supported tightly therein. The rod 16 has an attaching means 27, 28, to connect to the fishing line 20 from one end and to the fishing lure 21 from its other end which will be hereinafter described.

The fishing weight 10 may be quickly and easily removed from the fishing lure 21 to attach a desired weight to selectively and incrementally decrease or increase the weight of the weighted fishing hook. The fishing weight 10 may be applicable to any type of fishing lure 21. The fishing weight 10 of the present invention can be constructed and moulded in any shape.

Generally, the weight body 11 may have an elongated or elliptical egg, teardrop, polygonal or other shapes which is consistent with the functional requirements of the fishing weight 10. In some embodiments, the weight body 11 may be a metal such as tungsten, brass, aluminium or steel. The weight body 11 may have any desirable weight depending on the intended application of the fishing weight 10. Accordingly, the size and material of the weight body 11 may be selected to impart the desired weight to the fishing weight 10.

Figure 3:
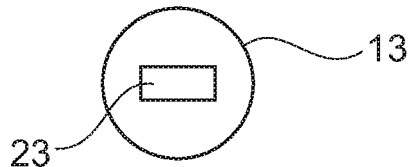
FIG. 3 is an illustrative front view of the interchangeable fishing weight.
Figure 4:
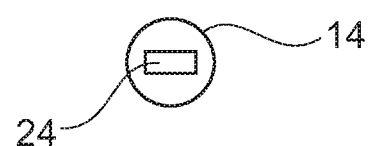
FIG. 4 is an illustrative rear view of the interchangeable fishing weight.

According to FIGS. 2, 3 and 4 the weight body 11 have a front end 13 and a rear end 14, and provide a central bore elongated from the front end 13 to the rear end 14. The central channel 12 has a larger section and a smaller section. The larger section is closer to the front end 13 and the smaller section is closer to the rear end 14. The larger and smaller sections are about the same length, but are different in the cross-sectional dimensions. The opening of the channel on the front end 23 is larger than the opening of the channel on the rear end 24. This allows a user to quickly release the weight from a fishing lure, as will be described next.

Figure 5:
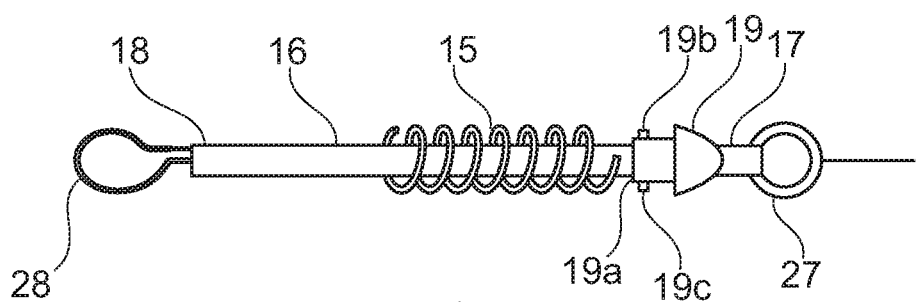
FIG. 5 is a longitudinal view of the rod member of the fishing weight.
Figure 6:
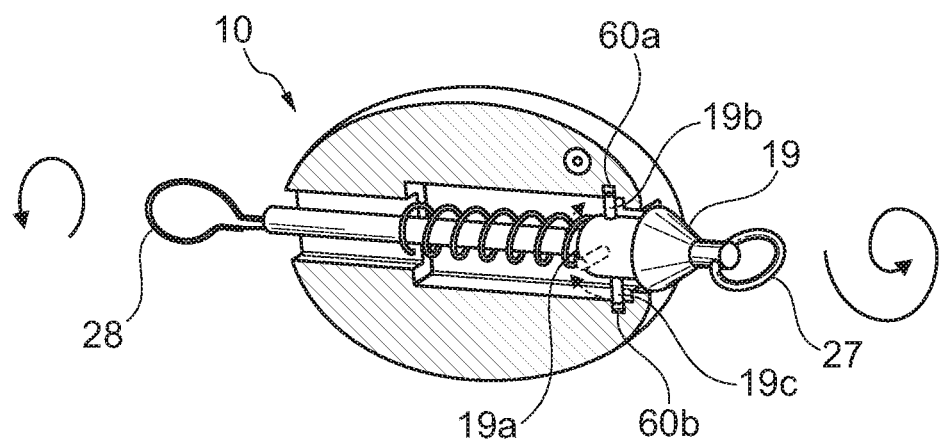
FIG. 6 is a longitudinal sectional view of the interchangeable fishing weight, when the rod member is inserted within the fishing weight and rotated.

As shown in FIG. 5, the length of the rod 16 is slightly longer than the length of the weight 10. A compression spring 15 is positioned around the rod 16. The diameter of the spring 15 is such that it can be inserted inside the larger section of the channel, but it does not go through the smaller section of the channel 12. Rod 16 has connection means on its proximal end 17 and its distal end 18. The connection means on the proximal end of the weight 17 is an eye ring 27 to knot a fishing line thereto.

The rod head on the distal end 18 has a clip or twist connector 28 to quickly connect the fishing weight 10 to fish lures 21 and provides a secure connection without disconnecting the whole system. Any kind of artificial lure or a hook for live bait may be connected to connector 28. Built with a twist connection on one end provides anglers the ability to swap out weight from lures with a simple turn, and a very fast process to change the weight. It will be appreciated that other types of releasable connecting mechanisms can be provided, which will secure the weights on the line.

Referring to FIGS. 1 and 2, again, a cone shape member 19 is provided on the proximal end 17 of the rod 16 in proximity to the ring head 27 to block the channel 12 and provide more stability to the rod 16 within the channel. The cone shape member 19 have a base part 19a with a smaller diameter which allows it to rotate freely inside the channel 12. The weight body has a lip 60 on its front end 13 to allow the rod 16 to rotate inside the channel. The cone shape member 19 has a set of protrusions 19b, 19c that will be locked into a set of perforations 60a, 60b under the lip 60 of the fishing weight. The cone shape member 19 further has a fish shape head look.

FIGS. 2 to 11 illustrate the steps of installing the rod member 16 of fishing weight 10. In operation, when an angler desires to install the weight 10 on the fish line 20, the rod 16 is pushed from its distal end 18 into the front opening of the channel 23 toward the rear opening 24. The rod 16 is slightly longer in length than the length of the channel 12, thereby when the rod 16 is inserted into the channel 12 the compression of spring 15 forces the rod 16 to slightly stick out of the channel 12, so that the rod 16 can be rotated to 90 degrees clockwise or counter clockwise to align the rod 16 to an opposite direction with respect to the openings 23, 24. The base part of the cone shape member 19a further rotates along with the rod 16 beneath the lip 60 and the protrusions of the base part 19b and 19c lock within the corresponding perforations 60a, 60b of the channel. The rod 16 will be locked by the force of spring 15 and the rod head connector 28 and the cone shape head 19 (frictionally) within the channel 12, preventing the rod from sliding out of the channel 12.

Figure 7:
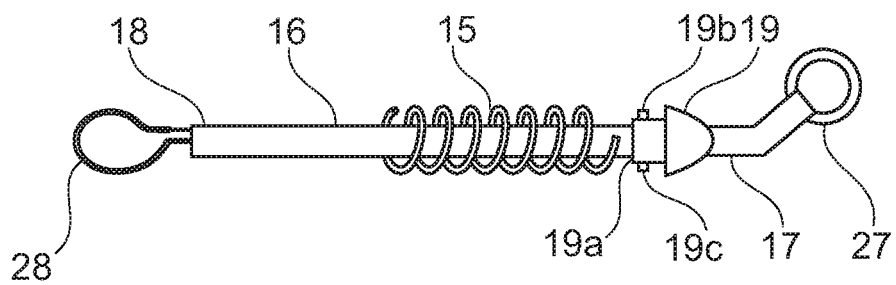
FIG. 7 is a longitudinal sectional view of the interchangeable fishing weight, when the rod member is inserted within the fishing weight to be connected to the fish lure.
Figure 8:
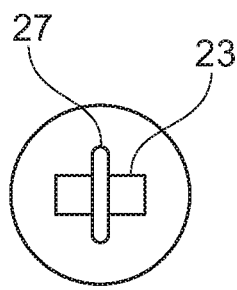
FIG. 8 is an illustrative front view of the interchangeable fishing weight with the rod member inserted therein.
Figure 9:
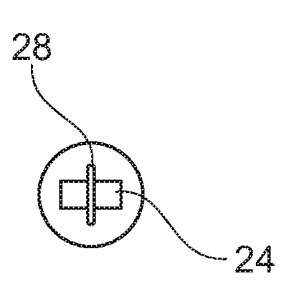
FIG. 9 is an illustrative rear view of the interchangeable fishing weight with the rod member inserted therein.
Figure 10:
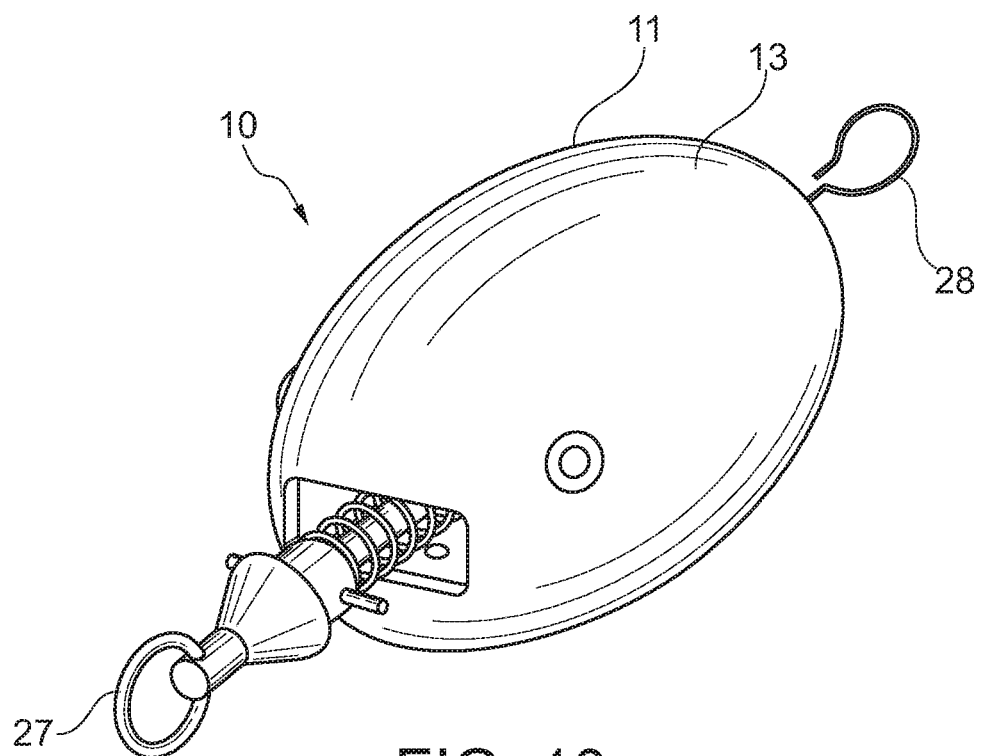
FIG. 10 is a perspective view of the present invention showing the rod member inserted into the fishing weight.
Figures 11A, 11B, 11C:
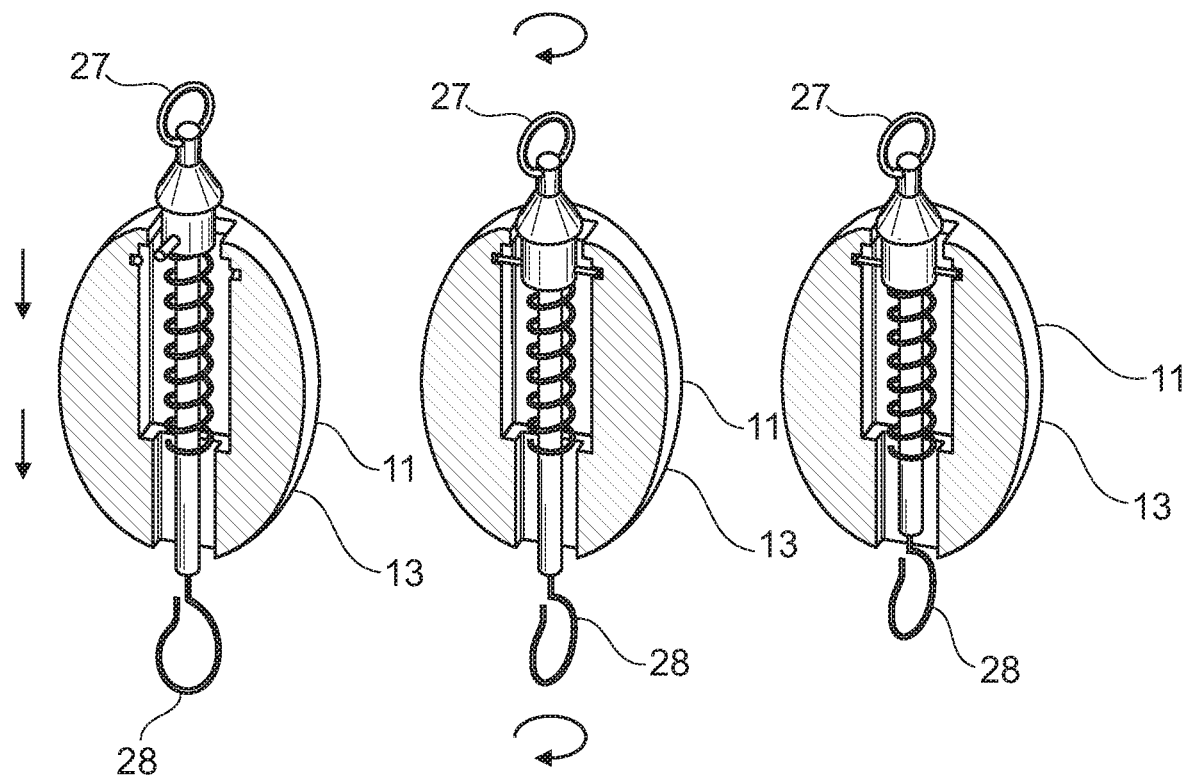
FIG. 11A is a front view of the fishing weight showing the method of operation of the present invention.
FIG. 11B is a front view of the fishing weight showing the method of operation of the present invention.
FIG. 11C is a front view of the fishing weight showing the method of operation of the present invention.

In another embodiment as shown in FIG. 7 the rod 16 may have a slight bend on its proximal end 17 and tipped up to provide a better motion to the weight 10 in the water.

As disclosed before, the spring 15 is compressed in the wider portion of the channel 12 and have a dimension larger than the narrow portion of the channel, so that it does not extend to the narrow portion. When changing the weight 10, the rod 16 is rotated by 90 degrees bringing the rod heads 17, 18 in a direction that allows rod 16 to be pulled out of the channel 12 and the action of spring 15 provides a quick release of the rod 16 from the weight 10.

All parts of the present invention 10 are preferably made of non-corrosive metallic materials. The metal can be selected from brass, tungsten, steel. Bismuth or other suitable metals. The weights of the present invention 10 can be made in any shape such as: cylindrical shape, Pyramid shape, Barrel or egg shape, Bullet shape or bell shape as long as they follow, in general, the principles of the invention to achieve the desired casting and sinking characteristics, which is largely a function of the fishing weight 10. The fishing weight 10 can be selectively changed from the fishing lure 21, as was heretofore described.

Figure 12A:
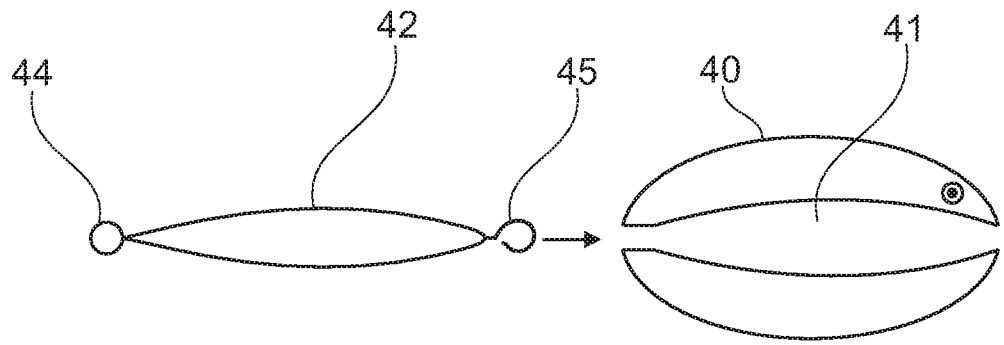
FIG. 12A is a front view of another embodiment of a fishing weight.
Figure 12B:
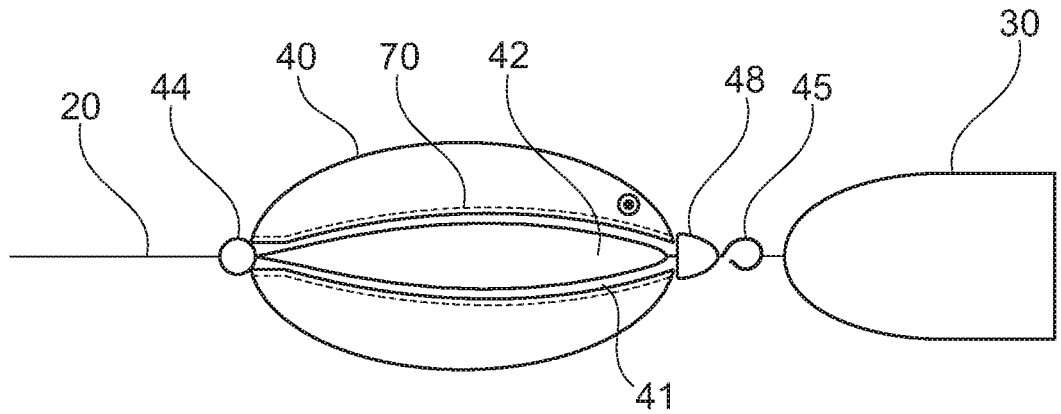
FIG. 12B is a front view of the embodiment of the fishing weight according to FIG. 12A.
Figure 12C:
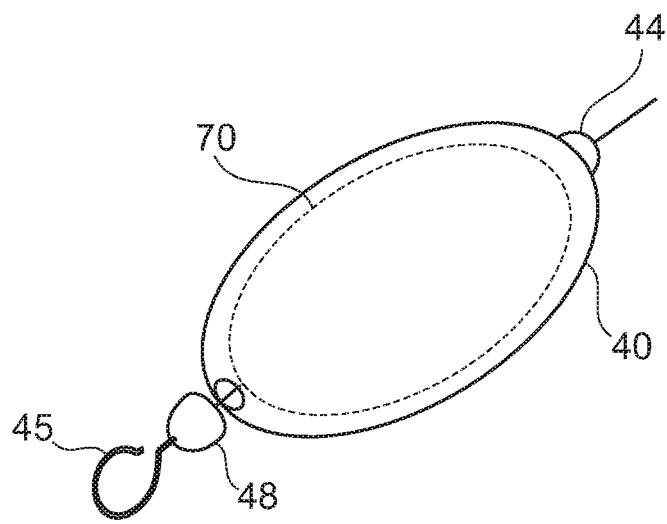
FIG. 12C is a front view of the embodiment of the fishing weight according to FIG. 12A.

FIGS. 12A to 12C show another embodiment of the present invention. The weight body 40 has an inner channel (opening) 41. The channel 41 has a substantially ellipsoidal shape in which a squeezable metal spring 42 can slidably be inserted within the channel 41 and be tightly supported therein. The metal spring 42 provides flexible attaching means 44, 45 to be disposed easily into the channel 41 and connect to the fishing line from one end 20 and to the fishing lure 21 from its other end. The metal spring 42 may be quickly and easily pulled out from the fishing weight 40 to attach to a desired weight.

The central channel 41 in this embodiment is constructed in dimensions such that when the metal spring 42 is squeezed and inserted into the channel 41, it will expand within the channel 41 to be secured tightly by the walls of the channel 41. A groove 70 is constructed longitudinally inside the channel 41, so that when the metal spring is inserted into the channel and rotated, it will lock in the groove 70, thus it cannot further rotate. The metal spring 42 has a length to fit inside the channel 41 and has an ellipsoidal shape similar to that of the channel 41 when expanded. An end pieces 48, preferably made of rubber, is installed on the proximal end of the spring to secure and block the spring metal 42 within the weight 40 to prevent it from sliding out by the force of the strong fishes. The metal spring 42 can be squeezed by hand and slidably inserted into the channel 41 and secured by the ring heads 44. The cone shaped rubber 48 tightly fits within the channel 41 preventing pulling the metal spring 42 out of the weight 40.

Figure 13:
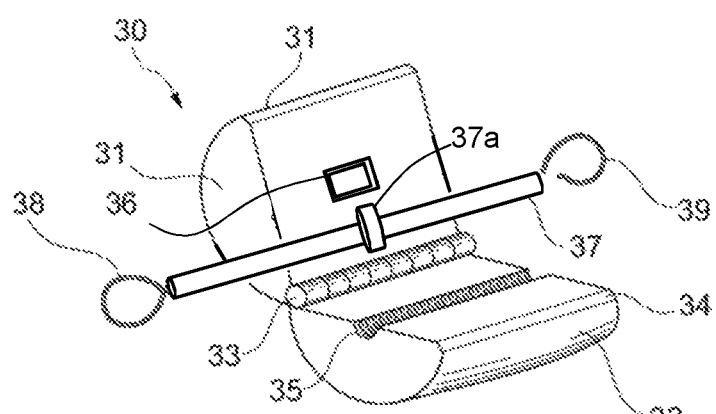
FIG. 13 is a perspective view of another embodiment of the fishing weight in open position.

FIG. 13 shows another embodiment of a fishing weight 30. The fishing weight 30 is a substantially cylindrical or ellipsoidal shape clip comprising a first part 31 and a second part 32 being connected by a hinge 33 and can be opened along the axel 34 by the force of hand. The inside of the clip 30 is designed to receive a connecting rod 37.

In one embodiment, the clip shape fishing weight 30 comprises a longitudinal groove on the inner portion of the second part 35. The connecting rod 37 has connecting means 38, 39 on its two end to connect to a fishing lure and a fishing line. A locking mechanism is provided to lock the connecting rod 37 inside the fishing weight 30. The locking mechanism comprises an engagement portion 37a on the connecting rod 37 and a perforation 36 on the inner portion of the first part 31 and is configured to function together. The engagement portion 37a of the connecting rod 37 is aligned with the perforation portion 36 of the weight and locked therein when the clip 30 is closed.

The fishing weight 30 further has a mechanical locking means along the axel 34 to lock the first part 31 and the second part 32 to lock the clip when closed. The fishing weight 30 can be forced to open along the opening axel 34, on which it is positioned by exerting a hand force in the axial direction to release and change the fishing weight 30. The fishing weight 30 will be released and another weight will be connected to the connecting rod 37.

Figure 14A:
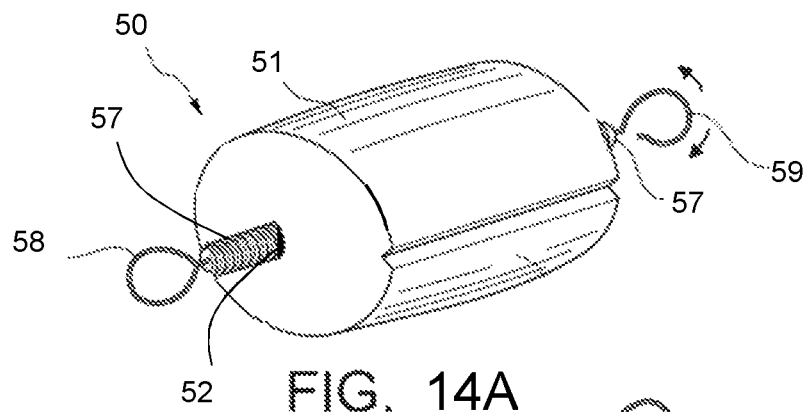
FIG. 14A is a perspective view of another embodiment of the fishing weight.
Figure 14B:
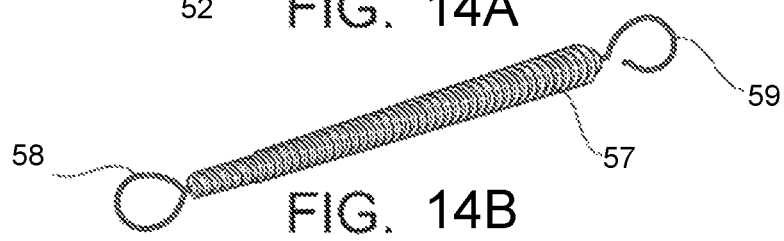
FIG. 14B is a perspective view of the connecting rod of the fishing weight according to the embodiment of FIG. 14A.

FIGS. 14A and 14B show another embodiment of a fishing weight 50. The fishing weight 50 has a substantially cylindrical or ellipsoidal body 51 comprising a central channel 52 within the body 51. The channel 52 is threaded to receive a screw type connecting rod 57. The connecting rod 57 is a conical shape screw rod to be tightly screwed through the weight 50. The conical shape of the rod 57 provides a locking mechanism to lock the connecting rod 57 inside the fishing weight 50. The connecting rod 57 has flexible connecting means 58 and 59 on its ends to connect to a fishing lure and a fishing line.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An interchangeable fishing weight to be changed on a fishing line and releasably connected to a fishing lure, comprising:
   a) a weight having a first end, a second end, and a channel extending from said first end to said second end and having a first opening and a second opening, wherein said channel comprising a larger diameter section closer to the first opening and a smaller diameter section closer to the second opening,
   b) a rod having a proximal end and a distal end, a connecting mechanism on the proximal end configured to connect to a fish line and a twist connector on the distal end configured to connect to a fish lure;
   c) a compression spring disposed on said rod and is sized to fit only inside said larger diameter section of said channel;
   d) a locking mechanism to lock the rod and the compression spring inside the channel, wherein when said rod is inserted into said channel from its distal end until said twist connector sticks out of said second opening by force of compression of said spring, said rod is then rotated 90 degrees clockwise or counter clockwise to align said connecting mechanism and said twist connector in opposite direction with respect to said first opening and said second opening so that the force of compression of said spring between said connecting mechanism and said twist connector in conjunction with a compression force of said spring and said locking mechanism locks said rod in said weight, and wherein the weight can be quickly replaced by rotating and removing said rod in its entirety from the weight and inserting said rod into another weight.

2. The interchangeable fishing weight of claim 1, wherein the connecting mechanism of the proximal end of the rod is an eye ring configured to connect to a fish line.

3. The interchangeable fishing weight of claim 1, wherein the locking mechanism to lock the rod and the compression spring inside the channel is a cone shaped member on said proximal end of said rod, said cone shaped member is configured to press fit within said channel.

4. The interchangeable fishing weight of claim 3, wherein said channel further comprises an inwardly extended lip around said first opening to further support the cone shaped member inside the channel.

5. The interchangeable fishing weight of claim 3, wherein said cone shaped member comprises a base part that has a set of protrusions and said channel has a set of perforations on its inner wall, wherein said protrusions of said cone shaped member lock into said perforations of said channel.

6. The interchangeable fishing weight of claim 1, wherein said proximal end of said rod has a bent end.

7. The interchangeable fishing weight of claim 1, wherein said weight has an elongated elliptical egg, teardrop, or polygonal shape.

8. The interchangeable fishing weight of claim 1, wherein said weight is made of a metallic substance selected from the group consisting of tungsten, brass, aluminum, or steel.

\* \* \* \* \*